(12) United States Patent
Zhang

(10) Patent No.: US 11,004,060 B2
(45) Date of Patent: May 11, 2021

(54) FARE COLLECTION DEVICE FOR MEANS OF PUBLIC TRANSPORT

(71) Applicant: ADVANCED NEW TECHNOLOGIES CO., LTD., Grand Cayman (KY)

(72) Inventor: Hong Zhang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/745,657

(22) Filed: Jan. 17, 2020

(65) Prior Publication Data

US 2020/0151705 A1    May 14, 2020

Related U.S. Application Data

(63) Continuation of application No. PCT/CN2018/102739, filed on Aug. 28, 2018.

(30) Foreign Application Priority Data

Nov. 3, 2017   (CN) .......................... 201711070469.2

(51) Int. Cl.
  *G06Q 20/32*      (2012.01)
  *G06T 7/50*       (2017.01)
(52) U.S. Cl.
  CPC .......... *G06Q 20/3278* (2013.01); *G06T 7/50* (2017.01); *G06Q 2240/00* (2013.01)
(58) Field of Classification Search
  CPC .............. G07B 15/06; G06K 9/00711; G06K 2009/00738; G07C 9/15; G06Q 20/3278

USPC ........... 705/13; 348/149; 340/5.32; 713/168
See application file for complete search history.

(56) References Cited

U.S. PATENT DOCUMENTS

| | | |
|---|---|---|
| 6,415,978 B1 | 7/2002 | Mcallister |
| 6,732,922 B2 | 5/2004 | Lindgren et al. |
| 8,376,227 B2 | 2/2013 | Hammad et al. |
| 8,733,663 B2 | 5/2014 | Hammad et al. |
| 8,954,344 B2 | 2/2015 | Lishak |

(Continued)

FOREIGN PATENT DOCUMENTS

| | | |
|---|---|---|
| CN | 201965675 U | 9/2011 |
| CN | 105719133 A | 6/2016 |

(Continued)

OTHER PUBLICATIONS

"Transit to See a New Payment Option", Mar. 18, 2014; masstransitmag.com, 7 pages (Year: 2014).*

(Continued)

*Primary Examiner* — John P Go
*Assistant Examiner* — Freda A Nelson

(57) ABSTRACT

A fare collection method and apparatus are provided. The apparatus comprises a camera; an NFC device; a processor, configured to: trigger a ride fare collection transaction upon a target object being detected within a set distance; determine whether a first payment information has been obtained by the camera; if yes, perform payment processing according to the first payment information; and if no, collect a near-field communication (NFC) signal through an NFC device to obtain second payment information, and perform payment processing according to the second payment information.

19 Claims, 3 Drawing Sheets

(56) References Cited

U.S. PATENT DOCUMENTS

| | | | |
|---|---|---|---|
| 9,501,768 B2 * | 11/2016 | Ho | G06Q 20/3276 |
| 9,741,178 B1 | 8/2017 | Handley | |
| 9,972,149 B2 * | 5/2018 | Busch-Sorensen | H04W 4/30 |
| 10,282,920 B2 | 5/2019 | Busch-Sorensen | |
| 2007/0205279 A1 | 9/2007 | Bistany | |
| 2008/0203170 A1 | 8/2008 | Hammad et al. | |
| 2013/0124319 A1 | 5/2013 | Hodge et al. | |
| 2013/0305035 A1 * | 11/2013 | Lyne | H04W 12/0013 |
| | | | 713/150 |
| 2013/0320087 A1 | 12/2013 | Moran et al. | |
| 2014/0015978 A1 * | 1/2014 | Smith | G07C 9/253 |
| | | | 348/156 |
| 2015/0044964 A1 | 2/2015 | Khan et al. | |
| 2015/0115028 A1 | 4/2015 | Montealegre | |
| 2015/0317841 A1 * | 11/2015 | Karsch | G07B 15/06 |
| | | | 348/149 |
| 2015/0341333 A1 * | 11/2015 | Feng | G06Q 20/3276 |
| | | | 713/168 |
| 2016/0019726 A1 | 1/2016 | Joy et al. | |
| 2016/0019727 A1 | 1/2016 | Norton et al. | |
| 2016/0042631 A1 * | 2/2016 | Ho | G01C 9/00 |
| | | | 340/5.32 |
| 2017/0213205 A1 | 7/2017 | Sinai et al. | |
| 2018/0165672 A1 | 6/2018 | Handley | |
| 2019/0095836 A1 | 3/2019 | Zaourar Michel et al. | |

FOREIGN PATENT DOCUMENTS

| | | | |
|---|---|---|---|
| CN | 105926486 A | 9/2016 | |
| CN | 205959313 U | 2/2017 | |
| CN | 106548443 A | 3/2017 | |
| CN | 206162792 U | 5/2017 | |
| CN | 107978022 A | 5/2018 | |
| EP | 2234032 A2 | 9/2010 | |
| EP | 2728528 A1 | 5/2014 | |
| TW | I554048 B | 10/2016 | |
| WO | 2013/184046 A1 | 12/2013 | |
| WO | WO-2013184046 A1 * | 12/2013 | G07B 11/00 |

OTHER PUBLICATIONS

First Search and First Office action for Taiwanese Application No. 107130828, dated Jun. 27, 2019, 7 pages.

Decision to Reject for Taiwanese Application No. 107130828, dated Nov. 14, 2019, 6 pages.

First Search for Chinese Application No. 201711070469.2, dated May 7, 2019, 1 page.

First Office Action for Chinese Application No. 201711070469.2, dated May 15, 2019, 3 pages.

Written Opinion of the International Searching Authority and International Search Report for International PCT Application No. PCT/CN2018/102739, dated Dec. 5, 2018, with partial English translation, 10 pages.

Search Report for European Application No. 18873661.5 dated Jun. 16, 2020.

Thales, "Transcity BV600", retrieved on Aug. 12, 2020, https://www.thalesgroup.com/sites/default/files/database/d7/asset/document/transcity_bv600_en_2.pdf.

L T Groot Obbink, "Design of a user-centered, closed payment border for public transport Design report, Aug. 2016 Expertise Centre for E-ticketing in Public Transport Opening the closed," Sep. 9, 2016, https://d1rkab7tlqy5f1.cloudfront.net/IO/Onderzoek/Delft_Design_Labs/OV-chipkaart_Graduation_Lab/TUD%20-%20Gates%20-%20Design%20Report%20-%20Groot%20Obbink.pdf.

Serenity Caldwell et al., "Accidental Apple Pay triggers: When iPhone and NFC don't get along," Apr. 16, 2015, https://www.imore.com/accidental-apple-pay-triggers-when-iphone-and-nfc-dont-get-along.

Examination Report for European Application No. 18 873 661.5 dated Feb. 23, 2021.

* cited by examiner

FARE COLLECTION DEVICE FOR MEANS OF PUBLIC TRANSPORT

CROSS REFERENCE TO RELATED APPLICATION

The present application is a continuation application of International Patent Application No. PCT/CN2018/102739, filed on Aug. 28, 2018, which claims priority to Chinese Patent Application No. 201711070469.2, filed on Nov. 3, 2017. The entire content of the above referenced applications is incorporated herein by reference.

TECHNICAL FIELD

The present application relates to the field of information technologies, and in particular, to a fare collection method and device for a public transport means.

BACKGROUND

Nowadays, mobile terminals, such as cell phones, tablet computers, and the like, are generally integrated with multiple functions. A user may process different transactions in different transaction scenarios through these functions integrated in a terminal.

In exemplary applications, a user typically needs to use some fixed transaction processing manners for transaction processing in some transaction scenarios. For example, when the user rides the subway, the user typically needs to use a terminal that supports the Near Field Communication (NFC) function or a subway card having an NFC chip to pay the subway fare, while the user is unable to pay the fare using other payment methods.

On the basis of the current technologies, a more effective payment method is needed.

SUMMARY

Embodiments provide a fare collection method and device for a public transport means to solve the problem of limited payment methods according to the current technologies that is inconvenient for users in the payment process.

According to a first aspect of the embodiments of this specification, a method for collecting fare is provided. The method comprises: triggering a ride fare collection transaction in response to a target object being detected within a set distance; determining whether an image has been collected through a camera; if the image is collected, determining whether first payment information is obtained through parsing the image, and if the first payment information is obtained, performing payment processing according to the first payment information; and if the image is not obtained or the first payment is not obtained, collecting a near-field communication (NFC) signal through an NFC device to obtain second payment information, and performing payment processing according to the second payment information.

In some embodiments, the NFC device comprises an NFC loop antenna.

In some embodiments, the camera is located within a loop of the NFC loop antenna, and faces a direction same as a signal receiving direction of the NFC loop antenna.

In some embodiments, performing payment processing according to the second payment information comprises: extracting the second payment information from the NFC signal; and deducting a ride fare according to the second payment information.

In some embodiments, the image comprises a Digital Object Unique Identifier (DOI).

In some embodiments, determining whether the first payment information is obtained comprises: determining whether the first payment information is obtained within a preset duration through parsing the image.

In some embodiments, the NFC device is in an off state by default, and the method further comprises: in response to determining the first payment information is not obtained, turning on the NFC device; and after performing payment processing according to the second payment information, turning off the NFC device.

In some embodiments, the method further comprises detecting, with one or more sensors, a distance between the one or more sensors and the target object, the one or more sensors comprising at least one of an image sensor and a rangefinder.

In some embodiments, the camera is in an off state by default; and the method further comprises: when triggering the ride fare collection transaction, activating the camera; and after collecting the image through the camera, turning off the camera.

According to a second aspect of the embodiments of this specification, an apparatus for collecting fare is provided. The apparatus comprises: a camera; an NFC device; a processor, configured to: trigger a ride fare collection transaction upon a target object being detected within a set distance; determine whether a first payment information has been obtained by the camera; if yes, perform payment processing according to the first payment information; and if no, collect a near-field communication (NFC) signal through an NFC device to obtain second payment information, and perform payment processing according to the second payment information.

At least one of the above technical solutions adopted by the embodiments of the present specification may achieve the following beneficial effects.

In one or more embodiments of the present specification, even when it is impossible to collect a to-be-recognized image through the first collector, the second collector may be used to obtain payment information in a near-field non-contact data collection process, and then payment processing may be performed according to the obtained payment information. In other words, payment information may be obtained by various collectors in different manners. As a result, it is very convenient for the user during the collection of ride fares from the user.

BRIEF DESCRIPTION OF THE DRAWINGS

The accompanying drawings described herein are used to provide further understanding of the present application and constitute a part of the present application. The exemplary embodiments of the present application and the description thereof are used to describe the present application and do not constitute limitations to the present application. In the accompanying drawings.

DETAILED DESCRIPTION

A user typically needs to use some fixed transaction processing manners in some transaction scenarios. For example, when the user rides a subway, the user may pay for the ride only by using the NFC function of a terminal that supports the Near Field Communication (NFC) function or a subway card having an NFC chip, while no other methods may be available to pay for the ride. In other words, the user may provide his/her own payment information to a subway turnstile through the NFC function of the terminal or the subway card, but cannot provide the payment information to the subway turnstile in other manners. Therefore, if the NFC function of the terminal or the subway card held by the user fails or the terminal does not have the NFC function, the user may not be able to pay the ride fare, which limits payment methods that the user may use to pay the ride fare, leading to inconvenience for the user in the process of paying the ride fare.

As a result, the present specification provides a fare collection device for a public transport means, which activates a second collector to obtain payment information in a near-field non-contact data collection process when a to-be-recognized image is not collected by a first collector. In this way, the fare collection device is capable of collecting the payment information in various collection manners even when the user may only provide the payment information in a single manner. As a result, it is very convenient for the user during the collection of ride fares from the user. The fare collection device solves the problem of limited payment methods according to the current technologies that is inconvenient for users in the process of paying ride fares.

To describe the objectives, technical solutions and advantages of the present specification clearer, the technical solutions of the present application will be clearly and thoroughly described below with reference to exemplary embodiments and corresponding accompanying drawings. Apparently, the described embodiments are merely some, but not all, embodiments of the present application. All other embodiments obtained, based on some embodiments, by one of ordinary skill in the art without creative effort shall fall within the protection scope of the present application.

Technical solutions provided by the embodiments of the present application may be described in detail below with reference to the accompanying drawings.

Figure 1:
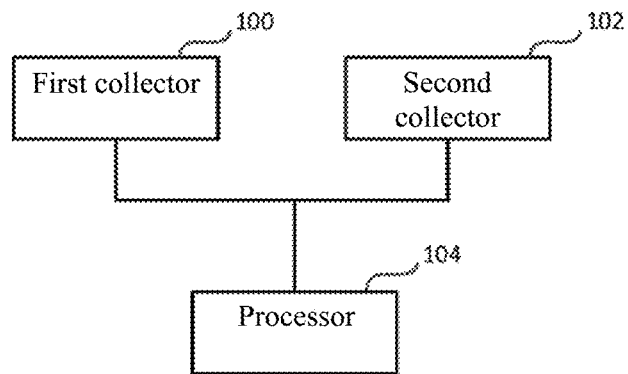
FIG. 1 is a schematic structural diagram of a fare collection device for a public transport means according to some embodiments.

FIG. 1 illustrates a fare collection device for a public transport means according to some embodiments, comprising a first collector 100, a second collector 102, and a processor 104. Here, the first collector 100 is configured to collect a to-be-recognized image and the second collector 102 is configured to obtain payment information through a near-field non-contact data collection process.

In some embodiments, when it is determined that there is a target object within a set distance from the fare collection device, the processor 104 is configured to trigger a ride fare collection transaction to first collect a to-be-recognized image through the first collector 100 and to determine payment information through parsing the to-be-recognized image, and then perform payment processing according to the payment information; if it is determined that no to-be-recognized image has been collected, obtain payment information in a near-field non-contact data collection process through the second collector 102, and perform payment processing. Here, the performing payment processing in the present specification may comprise: collecting a ride fare.

In some embodiments, the first collector 100 may at least comprise a camera. The to-be-recognized image in the present specification may comprise a Digital Object Unique Identifier (DOI), such as a 2-D barcode, a barcode, and the like, while an image that does not have DOI is not regarded as a to-be-recognized image.

In some embodiments, when the to-be-recognized image has been collected, the processor 104 may parse this to-be-recognized image to determine payment information of the user. For example, when the user displays a payment 2-D barcode with a cell phone, the processor 104 may parse a to-be-recognized image that comprises the payment 2-D barcode and is collected by the camera, so as to determine payment information of the user.

In addition, in some embodiments, the second collector 102 may at least comprise an NFC antenna for collecting NFC signals. Therefore, when the processor 104 activates the NFC antenna, the processor 104 may determine payment information according to the NFC signals collected by the NFC antenna.

In the present specification, the first collector 100 and the second collector 102 are not limited to a certain type of collectors, as long as the first collector 100 may collect a to-be-recognized image, and the second collector 102 may obtain payment information in a near-field non-contact data collection process to offer a user with diverse methods for paying ride fares.

Furthermore, in some embodiments, the first collector 100 is a camera, and the second collector 102 is an NFC antenna. To reduce the size of the fare collection device, the NFC antenna may be a loop antenna, i.e., an NFC loop antenna, while the camera may be located in an area within the loop of the NFC loop antenna. Moreover, the camera may face in a direction that is the same as the signal receiving direction of the NFC loop antenna, as shown in FIG. 2.

Figure 2:
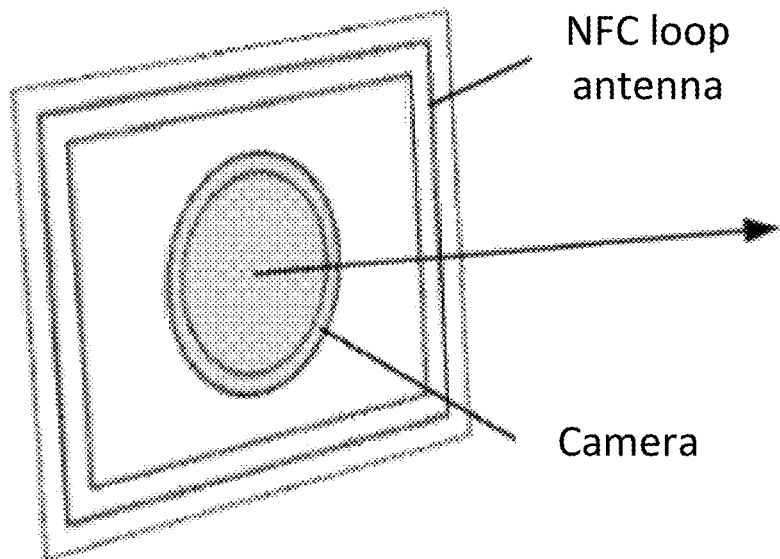
FIG. 2 is a schematic structural diagram of a camera and an NFC loop antenna according to some embodiments.

In the schematic diagram of the fare collection device shown in FIG. 2, the camera is located in an area within the loop of the NFC loop antenna, the area within the loop may be equipped with a transparent housing without obstructing the camera from collecting images. In FIG. 2, the NFC antenna is a rectangular loop antenna, and the direction that the camera faces and the signal receiving direction of the NFC loop antenna are indicated by an arrow.

In some embodiments, in a fare collection device that obtains payment information by means of 2-D barcodes according to the current technologies, there is typically a distance between a camera and the housing of the fare collection device, to prevent a user from placing a device for providing payment information (e.g., a cell phone, a tablet computer) too close to the camera to avoid losing focus on the 2-D barcode. Therefore, in the present specification, the camera may also be embedded at a distance under the housing of the fare collection device. This distance may be set as needed (e.g., no less than the minimum focus distance of the camera), which is not limited in the present specification.

In some embodiments, when the first collector 100 is a camera, the processor 104 may determine whether there is a target object within a set distance according to an image collected by the camera; if so, trigger a ride fare collection transaction, and if not, not trigger a ride fare collection transaction. After the ride fare collection transaction is triggered, corresponding operations are performed. In one example, the processor 104 may use the same method as the current technologies to determine whether there is a target object within a set distance according to the image collected by the camera, which is not elaborated herein. The camera may be in an activated state by default at this point and continuously collect images.

In some embodiments, the fare collection device may further comprise a sensor 106. The sensor 106 may be a camera or a rangefinder. When the sensor 106 is a camera, the above-described method may be used to determine whether there is a target object within a set distance. When the sensor 106 is a rangefinder, the rangefinder may continuously transmit signals (e.g., infrared ray, sound wave) to the surroundings of the fare collection device (or in one direction toward the fare collection device). When a target object is detected, the rangefinder may receive a corresponding reflected signal and then monitor the presence of the target object. The fare collection device may further determine a distance between the target object and the fare collection device according to the time difference between transmitting the signal and receiving the reflected signal. When monitoring that the target object is within the set distance, the fare collection device may determine that a user is approaching the fare collection device and the ride fare needs to be collected from the user, thereby triggering the ride fare collection transaction. Here, the set distance may be set as needed, and the target object may be a user or a device of the user that provides payment information.

Figure 3:
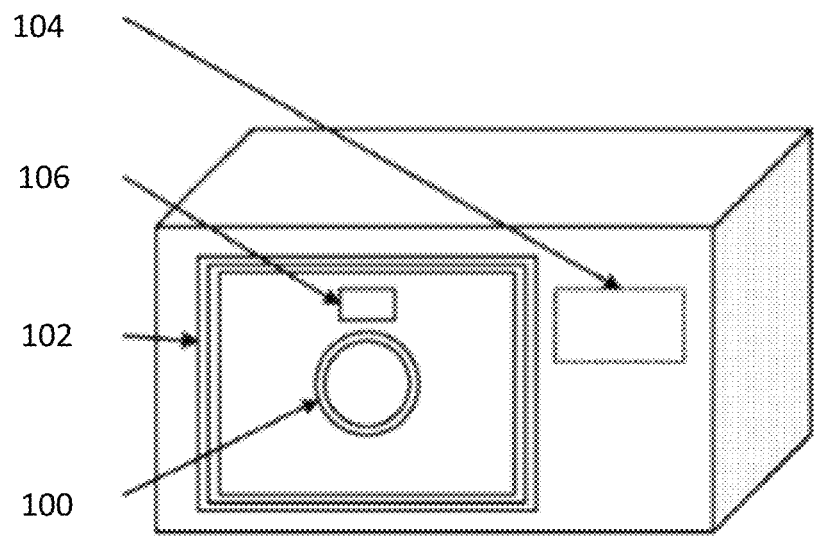
FIG. 3 is a schematic structural diagram of another fare collection device for a public transport means according to some embodiments.

FIG. 3 illustrates a schematic structural diagram of another fare collection device for a public transport means according to some embodiments. The fare collection device in FIG. 3 comprises a first collector 100, a second collector 102, a processor 104 and a sensor 106. Here, the first collector 100 is a camera, the second collector 102 is an NFC loop antenna, and the sensor 106 is a rangefinder located in a region between the camera and the NFC loop antenna for measuring the distance between the target object and the fare collection device. FIG. 3 is merely an example provided by the present specification and does not define a particular position of the sensor 106 on the fare collection device. Here, the processor 104 may be arranged inside the housing of the fare collection device, which is indicated by a dashed line rectangle.

Furthermore, in some embodiments, since whether to trigger a ride fare collection transaction may be determined based on data collected by the sensor 106, the first collector 100 may be in an off state by default.

In some embodiments, when a ride fare collection transaction is triggered, the processor 104 may activate the first collector 100 and then determine whether the first collector 100 has collected a to-be-recognized image; if so, parse the to-be-recognized image to obtain payment information, and collect a ride fare from the user according to the payment information; if not, activate the second collector 102, and obtain payment information in a near-field non-contact data collection process, so as to collect a ride fare from the user. Moreover, after determining whether the first collector 100 has collected a to-be-recognized image, the processor 104 may turn off the first collector 100. Here, the determining result comprises: the first collector 100 having collected a to-be-recognized image and the first collector 100 having not collected a to-be-recognized image. In other words, in the present application, the processor 104 may turn off the first collector 100 regardless of whether the first collector 100 has collected a to-be-recognized image. For example, if the first collector 100 has collected a to-be-recognized image, there is no need to further collect images through the first collector 100, and the first collector 100 may be turned off. If the first collector 100 has not collected a to-be-recognized image, it may be switched to the second collector 102 to obtain payment information. Similarly, there is also no need to collect an image through the first collector 100, and the first collector 100 may be turned off.

For example, as described above, when the first collector 100 is a camera, a to-be-recognized image may be collected using this camera, and the processor 104 may parse the to-be-recognized image to obtain payment information of the user. If this camera has not collected a to-be-recognized image, the processor 104 may switch to the second collector 102 to obtain payment information of the user in a near-field non-contact data collection process.

Furthermore, in some embodiments, the second collector 102 may be in an off state by default. When the processor 104 has not collected a to-be-recognized image, the processor 104 may activate the second collector 102.

In one example, when the second collector 102 is an NFC antenna, the processor 104 may activate the NFC antenna, so that the NFC antenna broadcasts an NFC excitation signal to terminals in the surroundings. When the NFC chip in a user's device (e.g., a terminal) for providing payment information receives the NFC excitation signal, the NFC chip may broadcast an NFC signal carrying the user's payment information. As a result, the NFC antenna may receive the NFC signal that is broadcast by the terminal. Therefore, according to the NFC signal, the processor 104 may extract the user's payment information to collect a ride fare from the user.

In some embodiments, the fare collection device may only activate one collector within any period of time to collect a user's payment information. For example, when the fare collection device currently activates the first collector 100 to collect a user's payment information, the second collector 102 may be turned off or put into sleep; while the first collector 100 may be turned off or put into sleep when the fare collection device activates the second collector 102 to collect the user's payment information. Particularly, the fare collection device only activates one collector within any period of time because, if the fare collection device activates two (or more) collectors at the same time, the process of payment processing by the user may be affected.

For example, assuming that the fare collection device is a subway turnstile that activates two collectors at the same time. When the user presents a payment 2-D barcode displayed on a cell phone to a camera of the turnstile for collecting to-be-recognized images, the second collector 102 (e.g., an NFC antenna) may also obtain an NFC signal carrying the user's payment information that is broadcast by the cell phone. At this moment, the user's cell phone may correspondingly pop up a page of paying the fare using the NFC function. However, this popped up page may cover the page that is used by the user for scanning a barcode, which may bring troubles in the process of fare payment by the user through barcode scanning.

In some embodiments, after the processor 104 obtains payment information through the second collector 102, the second collector 102 may be turned off or put into sleep, and the first collector 100 may be activated. As a result, when the ride fare collection transaction is triggered again, a to-be-recognized image is collected through the first collector 100.

Alternatively, if the first collector 100 is in an off state by default, the processor 104 may keep the first collector 100 in the off state.

It may be seen from the above-described method that, even when it is impossible to collect a to-be-recognized image through the first collector 100, the processor 104 may switch to the second collector 102 to obtain payment information in a near-field non-contact data collection process, and then collect the ride fare from the user. In other words, the fare collection device may collect the payment information in various collections manners even when the user may only provide the payment information in a single manner. As a result, it is very convenient for the user during the process of paying ride fares.

In addition, in some embodiments, when the first collector 100 is a camera, payment information may not be rapidly recognized even if the user provides a to-be-recognized image (i.e., an image comprising the payment information DOI) in cases where the environment is complex in exemplary application scenarios. For example, when the ambient light is too dark or too strong, the contrast of the 2-D barcode may be insufficient. As a result, the image carrying the 2-D barcode collected by the camera is not clear, and it is difficult for the processor 104 to parse this to-be-recognized image to obtain payment information. Therefore, in the present specification, the processor 104 may wait for a preset duration after triggering the ride fare collection transaction, and then switch to the second collector 102 only after determining that no payment information is obtained within the preset duration.

For example, in the present specification, the processor 104 may determine whether payment information has been obtained within a preset duration after triggering the ride fare collection transaction. The particular length of the preset duration is not limited in the present specification and may be set as needed. For example, assuming that the fare collection device is a fare collection device on a subway turnstile, and the subway company stipulates that a turnstile needs to complete a determination whether to open the turnstile within 300 ms (i.e., the maximum duration of each ride fare collection transaction may not exceed 300 ms). Then, the preset duration may be less than 300 ms, e.g., 150 m, so as to reserve a time for the second collector 102 to obtain payment information and for the processor 104 to collect the ride fare from the user.

In some embodiments, the fare collection device may comprise a housing 108 for protecting the fare collection device and a fixing part 110. The fixing part 110 may be connected to the housing 108 to fix the fare collection device onto a public transport means. The public transport means may comprise a bus, a tram, a taxi, etc.

In some embodiments, when the first collector 100 is a camera, the housing 108 may comprise a transparent area so as not to block the camera from collecting an image. In addition, when the second collector 102 is an NFC antenna, the NFC antenna may be disposed inside the housing 108 that protects the NFC antenna, while the material used by the housing 108 may be a material that does not block radio frequency signals emitted by the NFC antenna.

Figure 4:
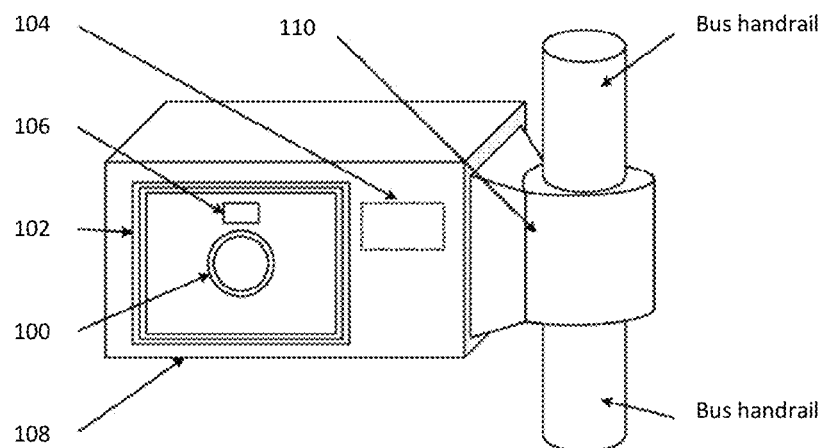
FIG. 4 is a schematic structural diagram of yet another fare collection device for a public transport means according to some embodiments.

For example, the present specification provides a fare collection device, comprising a first collector 100, a second collector 102, a processor 104, a sensor 106, a housing 108 and a fixing part 110, as shown in FIG. 4. It may be seen that the fare collection device is disposed inside the housing 108 for the protection by the housing 108. Moreover, the housing 108 is connected to a bus handrail via the connected fixing part 110 so as to be fixed onto the bus.

Figure 5:
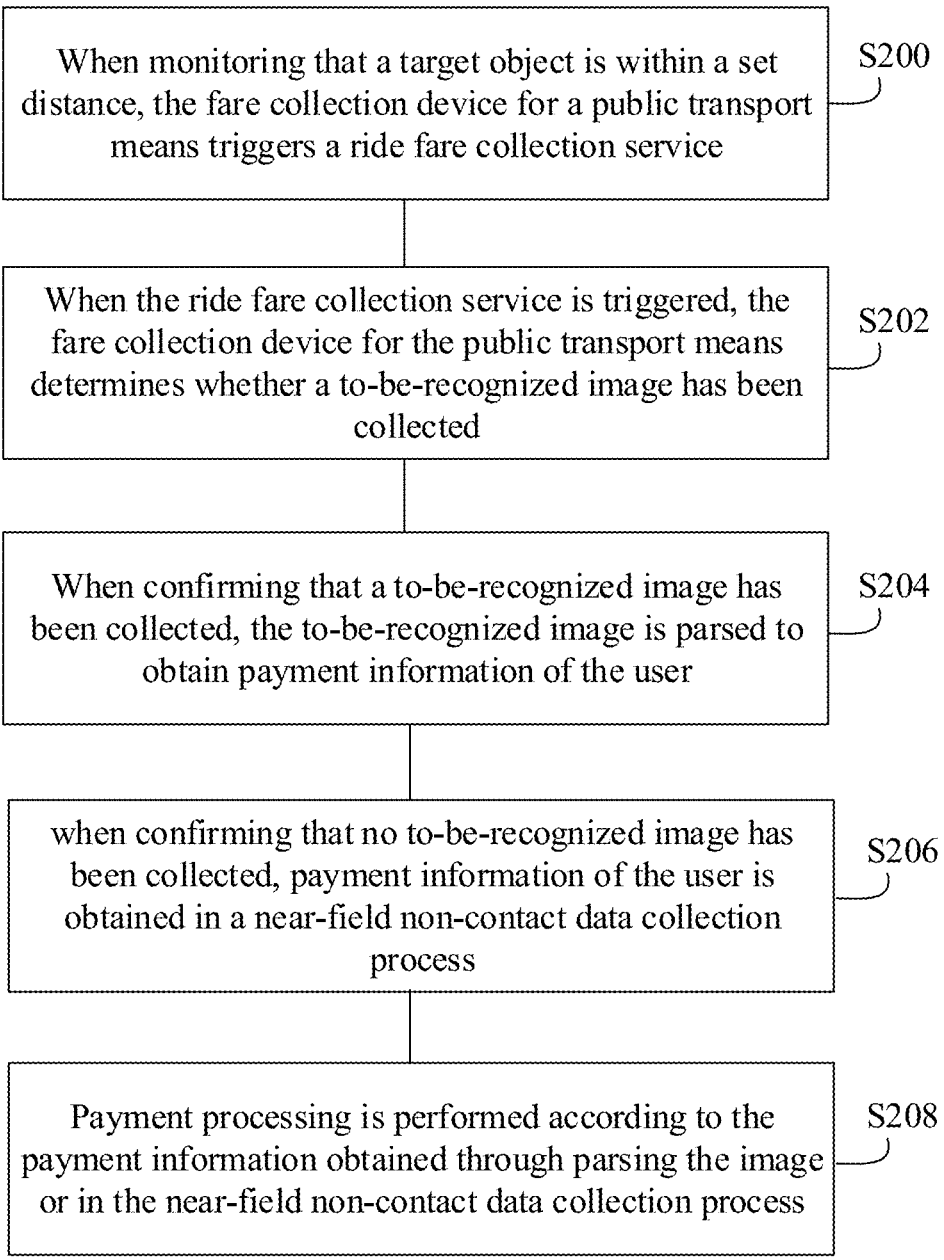
FIG. 5 is a flowchart of a payment processing according to some embodiments.

In addition, on the basis of the fare collection device shown in FIG. 1, the present specification further provides a payment method, as shown in FIG. 5.

FIG. 5 is a flowchart of a payment processing based on a fare collection device shown in FIG. 1 provided by the present specification. The method may, for example, comprise the following steps.

S200: when a target object is detected within a set distance, the fare collection device for a public transport means triggers a ride fare collection transaction.

S202: when the ride fare collection transaction is triggered, the fare collection device for a public transport means determines whether a to-be-recognized image has been collected.

S204: when confirming that a to-be-recognized image has been collected, the to-be-recognized image is parsed to obtain payment information of the user.

S206: when confirming that no to-be-recognized image has been collected, payment information of the user is obtained in a near-field non-contact data collection process.

S208: payment processing is performed according to the payment information obtained through parsing the image or in the near-field non-contact data collection process.

In the embodiments, the payment processing may be implemented by the fare collection device shown in FIG. 1. For example, when triggering a ride fare collection transaction, the processor 100 may monitor whether the first collector has collected a to-be-recognized image; when confirming that a to-be-recognized image has been collected, determine payment information by parsing the to-be-recognized image, and then collect a ride fare from the user; when confirming that no to-be-recognized image has been collected, activate the second collector to obtain payment information in a near-field non-contact data collection process, and collect a ride fare from the user according to the payment information.

To further describe the payment method according to the present specification, a detailed example is used below to describe the entire process that the payment method relates to.

For example, it is assumed that the fare collection device is on a public transport means, such as a card reader on a bus. When a user takes the bus, the fare collection device may emit a signal via a provided rangefinder to the surroundings to detect whether a target object is approaching the card reader. When the user approaches the card reader, the processor may determine, according to the emitted signal and a signal returned by the user, that a user is approaching the card reader, and when determining that the distance between the user and the fare collection device is less than a set distance, determine to trigger a ride fare collection transaction.

The user may invoke a payment 2-D barcode carrying the user's payment information from a cell phone in his/her hand, and the user may present the payment 2-D barcode displayed on the cell phone interface to the card reader for scanning.

The fare collection device is provided with a first collector (e.g., a camera) capable of collecting a to-be-recognized image. When the user moves the screen of a cell phone displaying a payment 2-D barcode close to the camera, the camera collects the payment 2-D barcode displayed by the cell phone, such that the processor may parse the payment 2-D barcode. When the processor successfully obtains the user's payment information by parsing the payment 2-D barcode, the processor may determine a fare to be paid by the user for riding the bus according to the payment information, and execute a corresponding deduction operation.

When the processor determines that no to-be-recognized image has been collected, the processor may activate a second collector (e.g., an NFC antenna) provided in the fare collection device, here, the NFC antenna is typically in an off or sleeping state.

The processor may obtain, via the NFC antenna, an NFC signal carrying the payment information of the user that is broadcast by the terminal (e.g., the user's device), and extract the payment information from the NFC signal. Then, the processor may execute a corresponding deduction operation according to the payment information.

When the processor completes the deduction operation, the NFC antenna may be turned off or put into sleep.

The above description uses a process of using a card reader on a bus to perform payment processing as an example. However, in some cases, the deduction operation may be completed when a user swipes a card at the time of getting off the bus. At this moment, the processor may determine to execute a corresponding deduction operation by obtaining the payment information twice (i.e., the payment information obtained by the fare collection device when a passenger gets on the bus, and the payment information obtained when the passenger gets off the bus). Here, the manners in which the payment information is obtained in the two times may not be completely the same, and how to particularly execute the deduction operation is not limited in the present specification.

For example, when the fare collection device is a fare collection device on a subway turnstile, a user presents his/her own payment 2-D barcode to a subway turnstile (a turnstile located at a station where the user enters the subway) when entering a station, while the subway turnstile may obtain payment information of the user by parsing the payment 2-D barcode, and then send the payment information as identification information to a server, such that the server identifies the starting station that the user takes the subway according to the payment information and the subway turnstile that sends the payment information. When exiting a station, the user may activate the NFC module of the cell phone, to cause a subway turnstile (a turnstile located at a station where the user exits the subway) to obtain an NFC signal broadcast by the user's cell phone, and then extract the payment information of the user from the NFC signal. The fare collection device may send the extracted payment information to the server, such that the server determines a fare to be paid by the user for taking the subway according to the payment information and executes a corresponding deduction operation. In other words, the fare collection device located on the entering station turnstile may collect a to-be-recognized image through a collector when the user enters a station, and then parse the to-be-recognized image to obtain payment information of the user; while the fare collection device located on the exiting station turnstile may collect payment information of the user through another collector when the user exits a station, and execute the deduction operation on the user.

In the present specification, the first collector and the second collector are relative concepts, and the present specification does not limit the fare collection device to be a particular collector. For different fare collection devices, the first collector and the second collector may not be completely the same. Collectors and collection manners that may be supported by the fare collection device are not limited only to the above-described two types, but may also be, for example, other manners such as a Bluetooth antenna and Bluetooth payment. In other words, the fare collection device may support various collectors. When one collector cannot collect payment information of a user, it may be switched to the next collector to collect the payment information of the user. If the payment information of the user still cannot be collected, it may be switched again to the next collector.

In the 1990s, an improvement to a technology may be obviously differentiated into a hardware improvement (e.g., an improvement to a circuit structure, such as a diode, a transistor, a switch, etc.) or a software improvement (an improvement to a flow of a method). With the technological development, however, many current improvements to method flows may be deemed as direct improvements to hardware circuit structures. Designers almost always obtain a corresponding hardware circuit structure by programming an improved method flow into a hardware circuit. Therefore, it cannot be concluded that an improvement to a method flow cannot be realized with a hardware module. For example, Programmable Logic Device (PLD) (e.g., Field Programmable Gate Array (FPGA)) is such integrated circuit of which logic functions are determined by a user through programming the device. A designer programs on his/her own to "integrate" a digital system onto one piece of PLD, who does not need to request a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language must be used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most commonly used right now includes VHDL (Very-High-Speed Integrated Circuit Hardware Description Language) and Verilog. One of ordinary skill in the art should also be aware that it would be very easy to obtain a hardware circuit to implement a logic method flow by using the above HDLs to carry out a little bit logic programming on the method flow and program the method flow into an IC.

A controller may be implemented in any proper manner. For example, a controller may be in, for example, a form of a microprocessor or processor, as well as a computer readable medium that stores computer readable program codes (e.g., software or firmware) capable of being executed by the (micro) processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of control logic of a memory. One of ordinary skill in the art should also be aware that, in addition to that a controller is implemented in a manner of pure computer readable program codes, it is totally feasible to perform logic programming on steps of a method to enable a controller to implement the same functions in a form of a logic gate, a switch, an ASIC, a programmable logic controller, an embedded microcontroller, etc. Therefore, such controller may be deemed as a hardware part, while devices comprised in the controller and configured to achieve various functions may also be deemed as a structure inside the hardware part. Alternatively, devices configured to achieve various functions may even be deemed as both software modules to implement a method and a structure inside a hardware part.

The system, apparatus, module, or unit described in the above embodiments may be implemented, for example, by a computer chip or entity, or implemented by a product having a function. A typical implementation device is a computer. In one example, a computer may be, for example, a personal computer, a laptop computer, a cellular phone, a camera phone, a smart phone, a personal digital assistant, a medium player, a navigation device, an email device, a game console, a tablet computer, a wearable device, or a combination of any devices in these devices.

For convenience of description, the above device is divided into various units according to functions for description. Functions of the units may be implemented in one or more pieces of software and/or hardware when the present application is implemented.

One of ordinary skill in the art should understand that the embodiments of the present invention may be provided as a method, a system, or a computer program product. Therefore, the present invention may be implemented as a complete hardware embodiment, a complete software embodiment, or an embodiment combing software and hardware. Moreover, the present invention may be in the form of a computer program product implemented on one or more computer usable storage media (including, but not limited to, a magnetic disk memory, CD-ROM, an optical memory, etc.) comprising computer usable program codes.

The present invention is described with reference to flowcharts and/or block diagrams of the method, device (system), and computer program product according to the embodiments of the present invention. A computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that may instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function specified in one or more processes in the flowcharts and/or in one or more blocks in the block diagrams.

In a typical configuration, the computation device includes one or more processors (CPUs), input/output interfaces, network interfaces, and a memory.

The memory may include computer readable media, such as a volatile memory, a Random-Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which may implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, magnetic cassettes, cassette and disk memories or other magnetic memory devices, or any other non-transmission media, which may be used for storing information accessible to a computation device. According to the definitions in the specification, the computer readable media do not include transitory media, such as modulated data signals and carriers.

The terms of "including", "comprising" or any other variants of the terms are intended to encompass a non-exclusive inclusion, causing a process, method, commodity, or device comprising a series of elements to not only comprise these elements, but also comprise other elements that are not clearly listed, or further comprise elements that are inherent to the process, method, commodity, or device. When there is no further restriction, elements defined by the statement "comprising one . . . " does not exclude that a process, method, commodity, or device comprising the above elements further comprises additional identical elements.

One of ordinary skill in the art should understand that the embodiments of the present application may be provided as a method, a system, or a computer program product. Therefore, the present application may be implemented as a complete hardware embodiment, a complete software embodiment, or an embodiment combing software and hardware. Moreover, the present application may be in the form of a computer program product implemented on one or more computer usable storage media (including, but not limited to, a magnetic disk memory, CD-ROM, an optical memory, etc.) comprising computer usable program codes.

The present application may be described in a regular context of a computer executable instruction that is executed by a computer, such as a program module. Generally, the program module comprises a routine, a program, an object, a component, a data structure, etc. for executing a particular task or implementing a particular abstract data type. The present application may also be practiced in distributed computing environments. In these distributed computing environments, remote processing devices connected via communication networks carry out tasks. In the distributed computing environments, a program module may be located in local and remote computer storage media, including storage devices.

The embodiments in this specification are described in a progressive manner with each embodiment focused on differences from other embodiments, and the embodiments may be mutually referenced for identical or similar parts. In particular, the system embodiment is described in a relatively simple manner, as the system embodiment is substantially similar to the method embodiment. The description of the method embodiment may be referenced for the related parts.

The above-described is only embodiments of the present application, which are not used to limit the present application. To one of ordinary skill in the art, the present application may have various modifications and changes. Any modification, equivalent substitution, or improvement made within the spirit and principle of the present application shall be encompassed by the claims of the present application.

What is claimed is:

1. A method for collecting fare, comprising:
triggering, by a fare collection device, a camera of the fare collection device to collect an image in response to a target object being detected within a set distance, wherein:
the fare collection device further comprises a near-field communication (NFC) device that is in an OFF state by default and a housing,
the camera is located within an NFC loop antenna of the NFC device and faces a direction same as a signal receiving direction of the NFC loop antenna, and
the camera is embedded at a distance under the housing of the fare collection device, the distance being no less than a minimum focus distance of the camera;
turning off, by the fare collection device, the camera and determining, by the fare collection device, whether the image has been collected;
in response to determining that the image has been collected, determining, by the fare collection device, whether first payment information is obtained through parsing the image, and if the first payment information is obtained, performing payment processing according to the first payment information;
in response to determining that the image has not been obtained or the first payment information is not obtained, turning on, by the fare collection device, the NFC device to collect an NFC signal to obtain second payment information, and performing payment processing according to the second payment information; and
turning, by the fare collection device, the camera back on and the NFC device off after obtaining the second payment information so that the NFC device does not interfere with the camera to collect images.

2. The method of claim 1, wherein the performing payment processing according to the second payment information comprises:
extracting the second payment information from the NFC signal; and
deducting a ride fare according to the second payment information.

3. The method of claim 1, wherein the image comprises a Digital Object Unique Identifier (DOI).

4. The method of claim 1, wherein the determining whether the first payment information is obtained comprises:
determining whether the first payment information is obtained within a preset duration through parsing the image.

5. The method of claim 1, further comprising:
detecting, with one or more sensors, a distance between the one or more sensors and the target object, the one or more sensors comprising at least one of an image sensor and a rangefinder.

6. The method according to claim 1, wherein the camera is in an off state by default.

7. An apparatus for collecting fare, comprising:
a housing;
an NFC device in an OFF state by default;
a camera located within an NFC loop antenna of the NFC device, facing a direction same as a signal receiving direction of the NFC loop antenna of the NFC device, and embedded at a distance under the housing, wherein the distance is no less than a minimum focus distance of the camera; and
a processor, configured to:
trigger the camera upon a target object being detected within a set distance;
turn off the camera and determine whether a first payment information has been obtained by the camera;
in response to determining that the first payment information has been obtained by the camera, perform payment processing according to the first payment information; and
in response to determining that the first payment information has not been obtained by the camera, turn on the NFC device to collect an NFC signal to obtain second payment information, and perform payment processing according to the second payment information; and
turn the camera back on and turn off the NFC device after obtaining the second payment information so that the NFC device does not interfere with the camera to collect images.

8. The apparatus of claim 7, wherein to perform payment processing according to the second payment information obtained by the NFC device, the processor is further configured to:
extract the second payment information from the NFC signal received by the NFC device; and
deduct a ride fare according to the second payment information.

9. The apparatus of claim 7, wherein to determine whether the first payment information has been obtained by the camera, the processor is further configured to:
determine whether the camera has collected an image.

10. The apparatus of claim 9, wherein the image comprises a Digital Object Unique Identifier (DOI).

11. The apparatus of claim 9, wherein the processor is further configured to:
in response to determining the camera has collected the image, determine whether the first payment information has been obtained within a preset duration through parsing the image collected by the camera.

12. The apparatus of claim 7, further comprises:
one or more sensors configured to detect a distance between the one or more sensors and the target object, the one or more sensors comprising at least one of an image sensor and a rangefinder.

13. The apparatus of claim 7, wherein the camera is in an off state by default.

14. A non-transitory computer-readable storage medium storing instructions that, when executed by one or more processors, cause the one or more processors to perform operations comprising:

triggering a camera electrically coupled with the storage medium to collect an image in response to a target object being detected within a set distance, wherein:
the storage medium is further electrically coupled with a near-field communication (NFC) device that is in an OFF state by default and a housing,
the camera is located within an NFC loop antenna of the NFC device and faces a direction same as a signal receiving direction of the NFC loop antenna, and
the camera is embedded at a distance under the housing of the storage medium, the distance being no less than a minimum focus distance of the camera;
turning off, by the storage medium, the camera and determining, by the storage medium, whether the image has been collected;
in response to determining that the image has been collected, determining, by the storage medium, whether first payment information is obtained through parsing the image, and if the first payment information is obtained, performing payment processing according to the first payment information;
in response to determining that the image has not been obtained or the first payment information is not obtained, turning on, by the storage medium, the NFC device to collect an NFC signal to obtain second payment information, and performing payment processing according to the second payment information; and
turning, by the storage medium, the camera back on and the NFC device off after obtaining the second payment information so that the NFC device does not interfere with the camera to collect images.

15. The storage medium of claim 14, wherein the performing payment processing according to the second payment information comprises:
extracting the second payment information from the NFC signal; and
deducting a ride fare according to the second payment information.

16. The storage medium of claim 14, wherein the image comprises a Digital Object Unique Identifier (DOI).

17. The storage medium of claim 14, wherein the determining whether the first payment information is obtained comprises:
determining whether the first payment information is obtained within a preset duration through parsing the image.

18. The storage medium of claim 14, wherein the operations further comprise:
detecting, with one or more sensors, a distance between the one or more sensors and the target object, the one or more sensors comprising at least one of an image sensor and a rangefinder.

19. The storage medium of claim 14, wherein the camera is in an off state by default.

* * * * *